United States Patent [19]
Sorimachi et al.

[11] 3,753,443
[45] Aug. 21, 1973

[54] APPARATUS FOR REMOVING FUEL VAPORS FROM A FUEL TANK ON A MOTOR VEHICLE

[75] Inventors: Yuichi Sorimachi, Toyota; Kazuo Okamoto, Nagoya, both of Japan

[73] Assignee: Toyota Jidosha Kogyo Kabushiki Kaisha, Aichi-ken, Japan

[22] Filed: May 8, 1972

[21] Appl. No.: 250,916

[30] Foreign Application Priority Data
May 25, 1971   Japan................................ 46/35691

[52] U.S. Cl. ............................................... 137/255
[51] Int. Cl. ............................................... F17c 3/00
[58] Field of Search.................... 137/255, 262, 263, 137/266, 43, 561, 574, 590, 592, 599, 602, 802

[56] References Cited
UNITED STATES PATENTS

| | | | |
|---|---|---|---|
| 1,335,093 | 3/1920 | Copetta ............................ | 137/266 |
| 1,329,997 | 2/1920 | Page ................................. | 137/255 |
| 1,948,401 | 2/1934 | Smith et al........................ | 137/255 |
| 2,969,803 | 1/1961 | Mosher............................. | 137/263 X |

Primary Examiner—Henry F. Klinksiek
Assistant Examiner—Robert J. Miller
Attorney—Richard K. Stevens et al.

[57] ABSTRACT

An apparatus for removing fuel vapors from a fuel tank on a motor vehicle, comprising a plurality of upstanding expansion chambers having different volumetric capacities and separated from one another by dividing walls except for the upper end portions thereof in which they communicate with one another through a common chamber. The expansion chambers have at the lower ends thereof openings communicating respectively with the upper corner portions of the fuel tank, and the expansion chamber communicating with the corner of the fuel tank located closest to the apparatus is provided with an especially large volumetric capacity as compared with the other expansion chambers. The apparatus further includes a check valve installed in a path provided for communication between the apparatus and the canister, crank case, etc. of the vehicle for controlling the flow of vapors therebetween. The apparatus may be manufactured as a very compact unit, and yet, is capable of very effective vapor separation irrespective of the position of installation thereof relative to the fuel tank.

6 Claims, 7 Drawing Figures

APPARATUS FOR REMOVING FUEL VAPORS FROM A FUEL TANK ON A MOTOR VEHICLE

This invention relates to an apparatus for removing vaporized fuel from a fuel tank on a motor vehicle.

One of the apparatuses of this kind available in the prior art comprises a separate expansion tank installed in a position above the inlet to the fuel tank of a motor vehicle. The apparatus includes four tubes provided for transfer of vaporized fuel from the fuel tank into the expansion tank and extended into the fuel tank through the upper portion thereof. These four tubes have open ends terminating in the vicinity of the four respective upper corners of the fuel tank. One of the tubes is connected to the bottom of the expansion tank, and the other three to the top thereof. The apparatus further includes an exhaust tube extending from the expansion tank to the canister, crank case or the like of the vehicle. But in order that the apparatus can effectively remove vapors from the fuel tank, it is essential to install the expansion tank at a level not lower than the inlet to the fuel tank. This involves a great difficulty in positioning the apparatus on a motor vehicle. Furthermore, the four tubes-extended into the four respective upper corners of the fuel tank impose extra complications, limitations or requirements on the design of the fuel tank, the mode of installation thereof on the vehicle and the necessary length of the tubes themselves. Additionally, it is necessary to provide a protector around that portion of each of the tubes which is carried in the wall of the fuel tank. These factors have all contributed to making the apparatus very expensive.

According to another apparatus known in the prior art, an expansion tank has been provided in the fuel tank of a motor vehicle, and a vapor separator comprising a plurality of upstanding tubular members of different lengths has been installed outside the fuel tank. The apparatus includes four tubes provided for transfer of vaporized fuel from the fuel tank into the vapor separator. The four tubes have open ends extending into the four respective upper corners of the fuel tank, and are connected at the other ends thereof to the lower ends of the upstanding tubular members of the vapor separator. The vapor separator is provided with an exhaust tube extending therefrom to the canister, crank case or the like of the vehicle. The expansion tank has obviously been arranged for installation in the fuel tank for the purpose of ensuring compensation for an increased volume of the fuel due to the temperature elevation thereof. This arrangement makes the fuel tank undesirably large. Moreover, this arrangement cannot prevent fuel oil from entering the expansion tank through a hole provided at the bottom thereof when the fuel tank is being replenished. Consequently, if the fuel in the fuel tank reaches an elevated temperature and increases in volume after a certain amount of fuel is accumulated in the expansion tank during a prolonged replenishment of fuel, it is no longer possible for the fuel tank to hold the increased volume of fuel therein. Furthermore, the holes provided in the top and bottom of the expansion tank are so small as to require the anti-corrosive provisions therefor which are made of synthetic resin, brass or the like, resulting in an extra cost for the manufacture of the expansion tank. A further drawback of this particular apparatus according to the prior art is due to the difference in length or height between the four upstanding tubular members of the vapor separator, which may cause the fuel to reach the canister, crank case or the like if the tubing connections between the fuel tank and the upstanding tubular members are done in a wrong or improper manner.

It is, therefore, an object of this invention to provide an improved, compact apparatus for removing vaporized fuel from a fuel tank on a motor vehicle, including a plurality of upstanding expansion chambers having different volumetric capacities, and a check valve provided in a vapor exhaust tube extending between the common outlet of the expansion chambers and the canister, crank case or the like of the vehicle in order to control the flow of vapors in the exhaust tube and thereby ensure effective vapor separation irrespective of the level of installation of the apparatus relative to the fuel tank.

The apparatus according to this invention includes a check valve adapted for letting the vaporized fuel out of the fuel tank when the pressure of the vapors in the fuel tank exceeds a predetermined value, while instead permitting the flow of fresh air into the fuel tank upon the pressure of the vapors in the fuel tank becoming negative, to thereby restore the pressure of the fuel tank to a level allowing for removal of vapors therefrom. Moreover, the apparatus may be installed at any appropriate level of height relative to the fuel tank because there is no possibility of any fuel entering the apparatus when the fuel tank is being replenished.

The apparatus includes a plurality of upstanding expansion chambers which have very large cross-sectional areas as compared with those of the tubes extending into the fuel tank (about 10 times as large, while the corresponding two parts of the apparatus according to the prior art have an equal cross-sectional area to each other), so that the apparatus according to this invention may be compactly sized despite the fact that the total volumetric capacity of the upstanding expansion chambers is even larger than necessary to accommodate an increased volume of fuel due to an elevated temperature. Therefore, the apparatus may be installed in any appropriate unoccupied space available on a motor vehicle, such as that of a trunk. Furthermore, the apparatus according to this invention may be formed of any thermosetting resin in a blow molding or clam shell molding process, and accordingly, manufactured for a very reasonable cost. Additionally, the tubes provided for removing vapors from the fuel tank may be concentrated adjacent one corner of the fuel tank to extend thereinto, thereby facilitating the tubing work and reducing the material and labor required therefor.

These and other objects, features and advantages of this invention will be better understood from the following detailed description and the accompanying drawings.

A preferred embodiment of this invention will now be described with reference to the accompanying drawings, in which.

Figure 1:
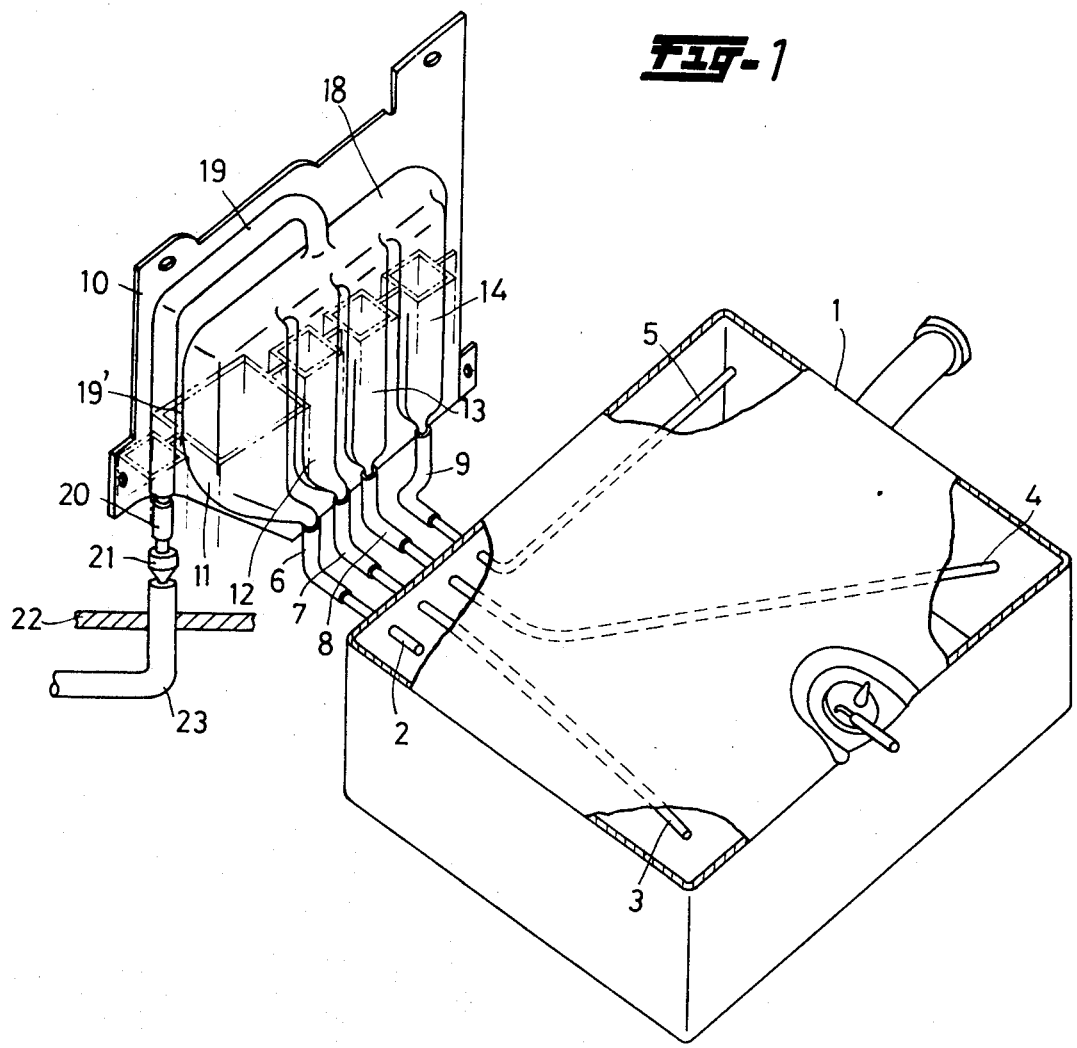
FIG. 1 is a perspective view schematically showing a preferred embodiment of this invention connected to a fuel tank on a motor vehicle.
Figure 5:
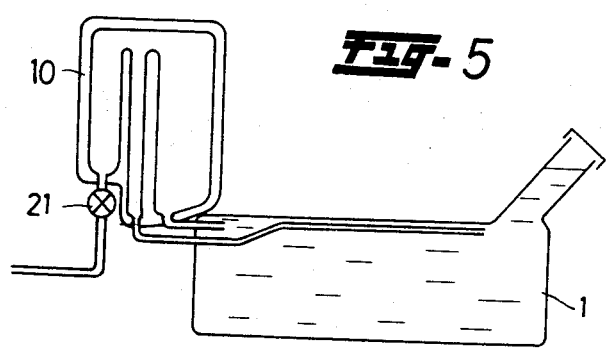
Figure 6:
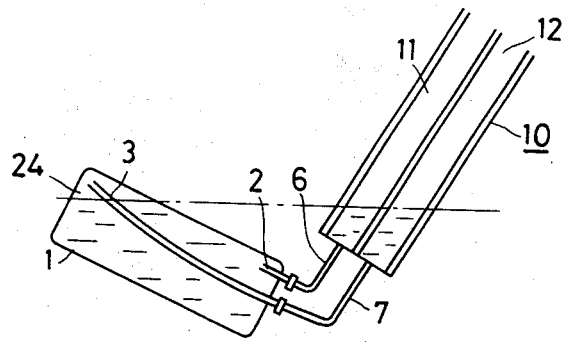
Figure 7:
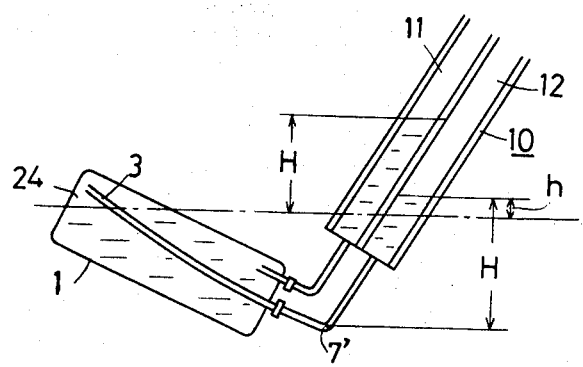

FIG. 5 schematically shows the embodiment of FIG. 1 together with a fuel tank full of fuel; and FIGS. 6 and 7 show the embodiment of FIG. 1 with an empty space formed in one corner of the fuel tank when the vehicle is in an inclined position.

Figure 2:
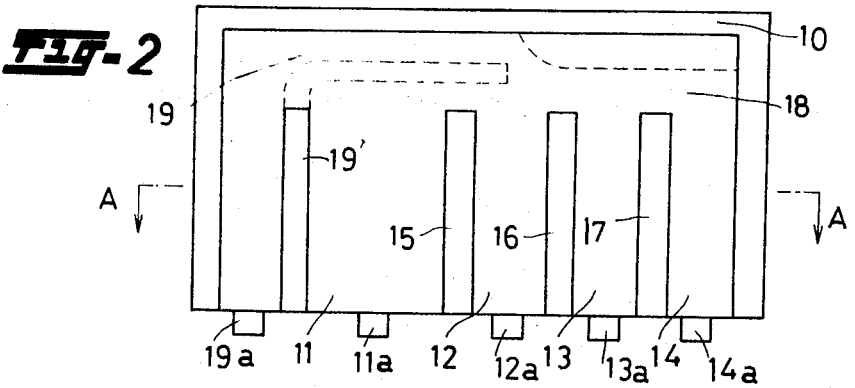
FIG. 2 is a front elevational view of the embodiment shown in FIG. 1.
Figure 3:
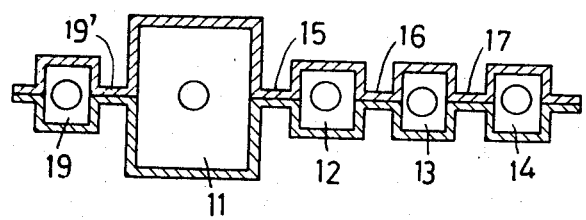
FIG. 3 is a cross-sectional view taken along the line A—A of FIG. 2.

Referring to FIG. 1 of the drawings, an apparatus according to this invention includes four tubes 2, 3, 4 and 5 provided for removal of vaporized fuel from a fuel tank on a motor vehicle into the apparatus. The tubes 2, 3, 4 and 5 extend into the fuel tank 1 through the upper portion of one side wall thereof, and terminate their open ends adjacent to the four respective corners of the fuel tank. The other ends of the tubes 2, 3, 4 and 5 are brought together where they project through said one side wall of the fuel tank, and open outwardly of the fuel tank. The outer open ends of the tubes 2, 3, 4 and 5 are joined with the lower open ends of hoses 6, 7, 8 and 9 respectively, and the other or upper ends of the hoses 6, 7, 8 and 9 are connected to the lower open ends 11a, 12a, 13a and 14a of four upstanding expansion chambers 11, 12, 13 and 14 respectively of a vapor separator 10 made of a thermosetting resin. The expansion chambers 11, 12, 13 and 14 are generally separated from one another by three dividing walls 15, 16 and 17 as shown in FIGS. 2 and 3 except for the upper ends thereof which communicate with one another via a common chamber 18. The outlet of the common chamber 18 is joined with, and opens into one end of a curved path 19 provided at the other or lower end thereof with an opening 19a (FIG. 2). The upright portion of the curved path 19 is separated from the expansion chamber 11 by a dividing wall 19'. The lower-end opening 19a of the curved path 19 is connected to one end of a hose 20, and the other end of the hose 20 is connected to one end of a check valve 21. The other or lower end of the check valve 21 is connected to one end of a hose 23 extending down through a floor 22 and communicating with the canister, the crank case of the engine or the like of the vehicle. The expansion chambers 11, 12, 13 and 14 have approximately ten times as large a cross-sectional area as the vapor transfer tubes 2, 3, 4 and 5, and especially, the cross-sectional area of the expansion chamber 11 connected to the tube 2 opening into the corner of the fuel tank 1 closest to the vapor separator 10 is by far larger than that of the tube 2. The total volumetric capacity of the expansion chambers 11, 12, 13 and 14 is greater than necessary to accommodate an increase in the volume of the fuel in the fuel tank 1 due to the temperature elevation thereof.

Figure 4:
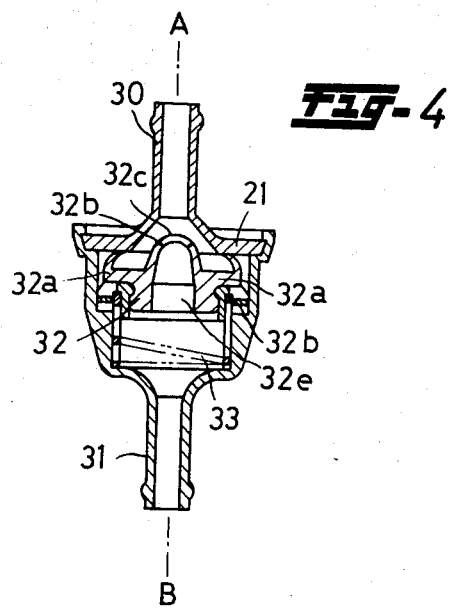
FIG. 4 is a vertical cross-sectional view of a check valve included in the embodiment shown in FIG. 1.

Referring to FIG. 4 of the drawings, the check valve 21 comprise a valve body composed of an upper casing 30 and a lower casing 31. The valve body houses a valve member 32 made of elastic material and having a rib 32a inwardly bent at the upper peripheral portion thereof, a vertically disposed port 32e, a diaphragm 32b enclosing the upper end of the port 32e and designed with an especially small thickness in the upper or central portion thereof, and a slit 32c provided in the center of the diaphragm 32b. The valve member 32 is provided around the lower outer periphery thereof with a guide ring 32d, and urged against the bottom surface of the upper casing 30 by a spring 33 provided under the valve member 32 in the lower casing 31. The upper end or central portion of the diaphragm 32b is so small in thickness that if there exists the slightest increase in the pressure on the side 'A' of FIG. 4 (the side closer to the vapor separator) over that on the side 'B' (the side closer to the canister, etc.), the slit 32c closes, while under the reverse condition, the slit 32c opens and thereby allows air to flow from the side 'B' to the side 'A.' In other words, as soon as the vapor in the fuel tank 1 exceeds a predetermined positive pressure, the slit 32c closes and the spring 33 is pushed down to thereby open the valve 21, and on the contrary, as soon as the vapor pressure in the fuel tank 1 becomes lower than the air pressure downstream of the valve 21, the slit 32c opens, and thereby allows the fresh air coming in through the canister or the like to flow through the vapor separator 10 into the fuel tank 1.

As long as the tank 1 is full of fuel as shown in FIG. 5, the check valve 21 does not open because the pressure of the vapors in the vapor separator is not higher than a predetermined level, so that fuel hardly enters the expansion chambers 11, 12, 13 and 14. On the other hand, as the fuel is burned, the temperature thereof rises and the pressure of the fuel vapors in the fuel tank 1 exceeds a predetermined level, the check valve 21 opens, and establishes communication between the fuel tank 1 and the canister or the like through the vapor separator 10, so that the vapors of the fuel are removed from the fuel tank 1 into the canister or the like.

In order to expand on the foregoing description concerning the operation of the apparatus according to this invention, attention is now directed to the worst possible situation in which a small vacant space 24 exists in the fuel tank 1, and the motor vehicle is inclined toward the vapor separator 10 installed thereon. The level of the fuel in the fuel tank 1 is flush with those of the fuel in the expansion chambers 11, 12, 13 and 14 as shown in FIG. 6 as long as the fuel tank 1 remains cold. But as the temperature of the fuel tank 1 rises, and the pressure of the vacant space 24 increases, the fuel in the tube 3 opening in one of the corners of the tank 1 far from the vapor separator 10 is pushed down until the level of the fuel in the tube 3 is lowered to the curved portion 7' of the hose 7. If there exists a head H between the fuel in the hose 7 and the fuel in the expansion chamber 12 connected to the hose 7, the level of the fuel in the expansion chamber 11 communicating with the tube 2 opening in the corner of the fuel tank 1 closest to the vapor separator 10 comes to the height H above the level of the fuel in the fuel tank 1. The expansion chamber 11 is designed with an especially large cross-sectional area as compared with that of the other chamber 12, 13 or 14 so that the height H between the level of the fuel in the expansion chamber 11 and the level of the fuel in the fuel tank 1 can be maintained reasonably small. A further increase in the pressure of the space 24 causes the vapors to go out through the tube 3 into the expansion chamber 12, and as soon as the pressure of the vapors in the expansion chamber 12 reaches a predetermined level, the check valve 21 opens, and thereby allows the vapors to flow out of the expansion chamber 12 into the canister or the like. When the vapors have been discharged from the vapor separator 10 and the pressure in the vapor separator 10 has been lowered to a predetermined level, the check valve 21 closes, and will remain closed until the pressure of the vapors in the vapor separator 10 has reached a predetermined level again. When the check valve 21 has closed, the fuel which increases in volume due to an elevated temperature starts to enter the expansion chambers 11, 12, 13 and 14, but the levels of the fuel in the expansion chambers 11, 12, 13 and 14 rise only slightly because the total volumetric capacity of the chambers 11, 12, 13 and 14 is larger than that which is required to accommodate the maximum possible increase in the total volume of the fuel in the fuel tank 1 due to the temperature elevation thereof. All the expansion chambers 11, 12, 13 and 14 are equal in height, but the overall height of the apparatus according to this invention can be kept reasonably small because the first expansion chamber 11 is designed with a very large cross-sectional area as compared with those of the tubes 2, 3, 4 and 5.

It will be obvious that various modifications or alterations may be made by those skilled in the art to the embodiment of this invention hereinabove described without departing from the spirit and scope of this invention which will be defined only by the appended claims.

What is claimed is:

1. An apparatus for removing fuel vapors from a fuel tank on a motor vehicle, comprising a plurality of upstanding expansion chambers separated by dividing walls, and a common chamber provided with a plurality of openings communicating with the upper end openings of said expansion chambers and another opening leading to the exterior of the apparatus, said expansion chambers being provided at the bottom thereof with openings communicating with the inner corners of said fuel tank, the total volumetric capacity of said expansion chambers being larger than that which is required to accommodate the maximum possible increase in the volume of the fuel in said fuel tank due to the temperature elevation thereof, and the expansion chamber communicating with the inner corner of said fuel tank located closest to the apparatus being designed with an especially large volumetric capacity as compared with those of the other expansion chambers.

2. The invention as defined in claim 1, including a plurality of means for establishing communication between said openings provided at the bottom of said expansion chambers and said corners of said fuel tank, wherein said expansion chambers have approximately ten times as large a cross-sectional area as said means.

3. The invention as defined in claim 1, wherein the apparatus is manufactured of a synthetic resin.

4. The invention as defined in claim 1, including a check valve provided in a path extending from said opening of said common chamber leading to the exterior of the apparatus for controlling the pressure of the vapors in said fuel tank.

5. The check valve of claim 4 comprising a valve body composed of an upper casing and a lower casing, and a valve member of elastic material slidably mounted in said lower casing and adapted to establish a hermetically sealed contact with the bottom surface of said upper casing.

6. The valve member of claim 5 having a vertical port, a diaphragm provided to enclose the upper end of said port which is formed with an especially small thickness, and a slit cut in the center of said diaphragm.

* * * * *